United States Patent
Baenziger et al.

(10) Patent No.: US 7,832,672 B1
(45) Date of Patent: Nov. 16, 2010

(54) BAIT CASTING REEL

(76) Inventors: Robert C. Baenziger, 4350 E. Saint John Rd., Phoenix, AZ (US) 85032; Casey Childre, 19922 Brinks Willis Rd., Foley, AL (US) 36535

( * ) Notice: Subject to any disclaimer, the term of this patent is extended or adjusted under 35 U.S.C. 154(b) by 0 days.

(21) Appl. No.: 12/398,276

(22) Filed: Mar. 5, 2009

Related U.S. Application Data

(60) Provisional application No. 61/044,531, filed on Apr. 14, 2008, provisional application No. 61/044,391, filed on Apr. 11, 2008, provisional application No. 61/034,040, filed on Mar. 5, 2008.

(51) Int. Cl.
*A01K 89/00* (2006.01)
*A01K 89/015* (2006.01)

(52) U.S. Cl. .................. 242/249; 242/241; 242/273; 242/277

(58) Field of Classification Search .......... 242/273, 242/274, 277–279, 241, 242, 249
See application file for complete search history.

(56) References Cited

U.S. PATENT DOCUMENTS

| 1,438,007 | A | 12/1922 | Welch |
| 1,507,404 | A | 9/1924 | Welch |
| 1,649,154 | A | 11/1927 | Curdy |
| 1,973,686 | A | 9/1934 | Maynes |
| 2,027,305 | A | 1/1936 | Maynes |
| 2,338,126 | A | 1/1944 | Maynes |
| 2,512,357 | A | 6/1950 | Maynes |
| 2,609,161 | A | 9/1952 | Guthlin et al. |
| 3,045,943 | A | 7/1962 | Forrester |
| 3,464,646 | A | 9/1969 | Odom |
| 4,688,346 | A * | 8/1987 | Collins .................. 43/22 |
| 4,770,362 | A | 9/1988 | Effinger |
| 5,150,854 | A * | 9/1992 | Noda .................. 242/310 |
| 5,560,562 | A * | 10/1996 | Hartmann .............. 242/255 |
| D404,792 | S * | 1/1999 | Oh .................... D22/140 |
| 5,865,388 | A * | 2/1999 | Yeh .................... 242/292 |
| 6,446,895 | B1 | 9/2002 | Baenziger et al. |
| 6,830,209 | B1 | 12/2004 | Baenziger et al. |
| 6,834,819 | B2 * | 12/2004 | Ikuta .................. 242/323 |
| 7,270,288 | B2 | 9/2007 | Baenziger et al. |
| 2007/0029426 | A1 * | 2/2007 | Baenziger et al. ...... 242/277 |

* cited by examiner

*Primary Examiner*—Evan H Langdon
(74) *Attorney, Agent, or Firm*—Cook Alex Ltd.

(57) ABSTRACT

A fishing reel is provided having a pair of opposed sidewalls with a spool holding fishing line rotatably supported between the sidewalls. The spool is freely rotatable in a first direction to release fishing line from the bottom portion of the spool, and is mechanically rotatable in a second direction opposite to the first direction to retrieve the fishing line and to wind the line back onto the spool. A handle crank is provided for imparting rotation to the spool in the second direction by rotation of the crank in the same, second direction.

16 Claims, 6 Drawing Sheets

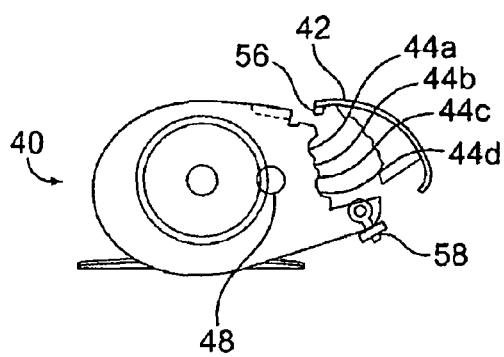
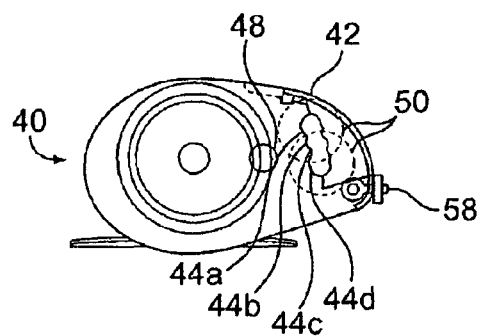
FIG. 8　　　　　　　　　FIG. 9
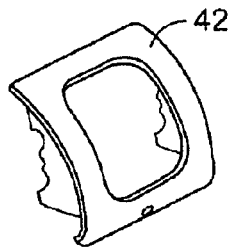
FIG. 10
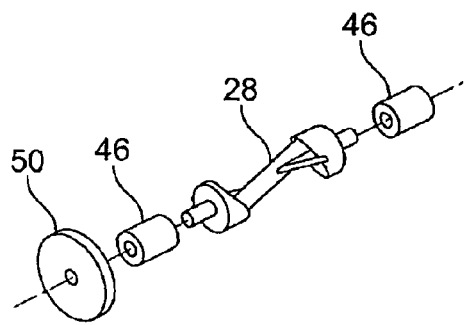
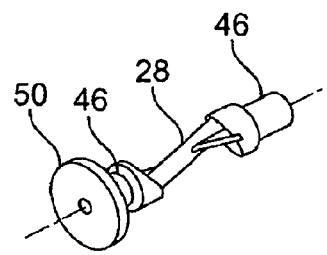
FIG. 11　　　　　　　　　FIG. 12

US 7,832,672 B1

BAIT CASTING REEL

CROSS REFERENCE TO RELATED APPLICATIONS

This application claims the benefit of the filing dates of U.S. Provisional Appln. U.S. Ser. No. 61/034,040, filed Mar. 5, 2008, U.S. Ser. No. 61/044,391, filed Apr. 11, 2008, and U.S. Ser. No. 61/044,531, filed Apr. 14, 2008, each of which is incorporated by reference herein.

BACKGROUND

The present application relates to improvements in fishing reels and more particularly to bait casting type fishing reels that have an open spool.

The bait casting reel, in most of its essential aspects, has been unchanged for the last 100 years. A bait casting reel typically includes an open spool held between opposed side plates that is freely rotatable about an axle or shaft in a first direction for casting. The line is retrieved or reeled in by rotating the spool in the opposite direction by means of a handle or crank. A level wind assembly is provided in front of the spool to cause the line to be evenly wound on the spool as it is being reeled in. See, e.g., Schmid U.S. Pat. No. 1,456,283.

While bait casting reels allow for a great deal of control when casting, they do tend to suffer from at least two shortcomings. First, bait casting reels are subject to line tangling known as "backlash" when casting if the spool rotates at a speed to release line at a faster rate than the bait being casted moving. Second, the level winds typically associated with bait casting reels have been relatively complex mechanisms and, as a result, susceptible to malfunction from exposure to the often harsh environments in which they are used. The bait casting reel disclosed herein addresses both of these shortcomings.

BRIEF DESCRIPTION OF THE FIGURES ON THE DRAWINGS

FIG. 8 is a side view of a bait casting reel having a selectively positionable level wind, with the reel partially disassembled to show detail, in accordance with a further aspect of the present disclosure.

FIG. 9 is a side view of the bait casting reel of FIG. 8 in its assembled condition.

FIG. 10 is a perspective view of a cover member forming part of the bait casting reel of FIGS. 8 and 9.

FIGS. 11 and 12 are, respectively, exploded and assembled views of a level wind suitable for use in the bait casting reel of FIGS. 8 and 9.

DETAILED DESCRIPTION

Figure 1:
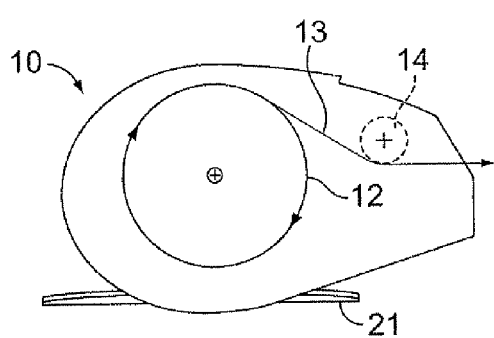
FIG. 1 is a side view of a bait casting reel according to the prior art.

With reference to FIG. 1, a bait casting reel 10 generally according to the prior art is shown. When casting, the spool 12 of the bait casting reel 10 rotates in a clockwise direction. Line 13 comes off "top" of a spool 12 to a level wind 14, typically, somewhere between the "12:00 o'clock" and the "3:00 o'clock" position. To retrieve the line 13, a handle (not shown for purposes of clarity) is rotated in a clockwise direction (as is conventional in all types of fishing reels) to rotate the spool 12 in a counterclockwise direction.

Figure 2:
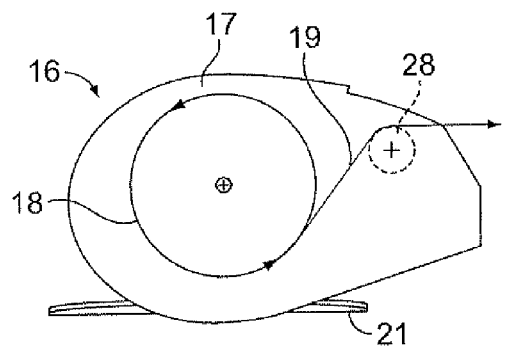
FIG. 2 is a side view of a bait casting reel in accordance with one aspect of the present disclosure.

With reference to FIG. 2, a bait casting reel 16 in accordance with one aspect of the present disclosure is shown. Specifically, applicants have determined that a particular advantage accrues to a bait casting fishing reel 16 in which, contrary to convention, the spool 18 freely rotates in a counterclockwise direction when casting (as shown in FIG. 2) to release line from the bottom portion of the spool adjacent the reel foot 21, and rotates in a clockwise direction when the line 19 is being reefed in in response to the clockwise turning to the handle crank (not shown). Specifically, Applicants have determined that such an unconventional arrangement results in a reduced likelihood of a experiencing a backlash when casting, caused by the spool rotating at a speed to unwind or release line at a faster rate than the line is traveling out the end of the fishing rod.

More specifically, a fishing reel is provided having a pair of opposed sidewalls 17 with a spool 18 holding fishing line 19 rotatably supported between the sidewalls. The spool 18 is freely rotatable in a first direction to release fishing line 19 from the bottom portion of the spool adjacent the reel foot 21, and is mechanically rotatable in a second direction opposite to the first direction to retrieve the fishing line and to wind the line back onto the spool 18. A handle crank 54 is provided for imparting rotation to the spool in the second direction by rotation of the crank in the same, second direction.

Figure 3:
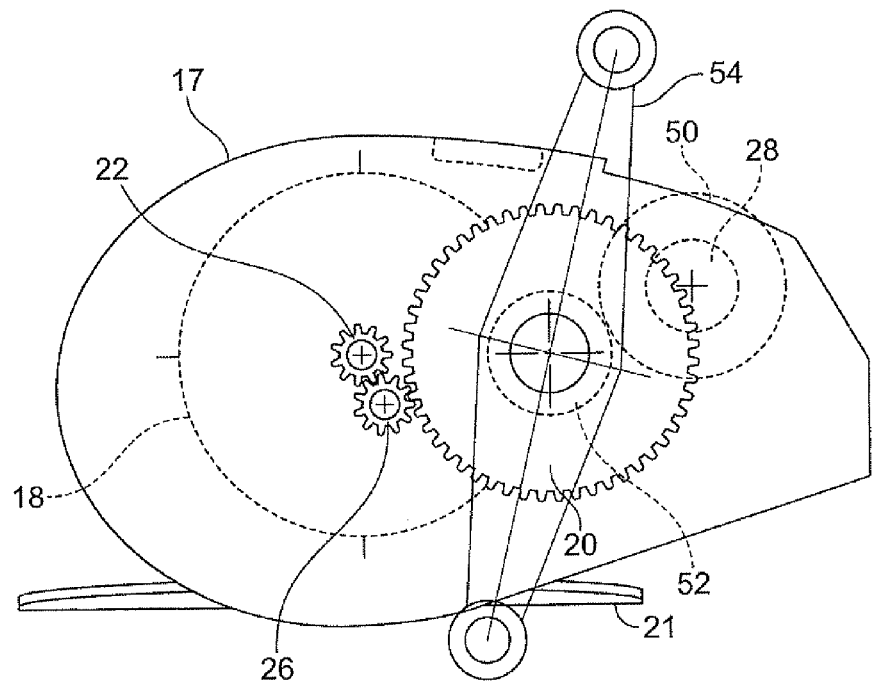
FIG. 3 is a side view of a bait casting reel in accordance with the present disclosure showing a first embodiment of a drive system for rotating the spool and the level wind.
Figure 4:
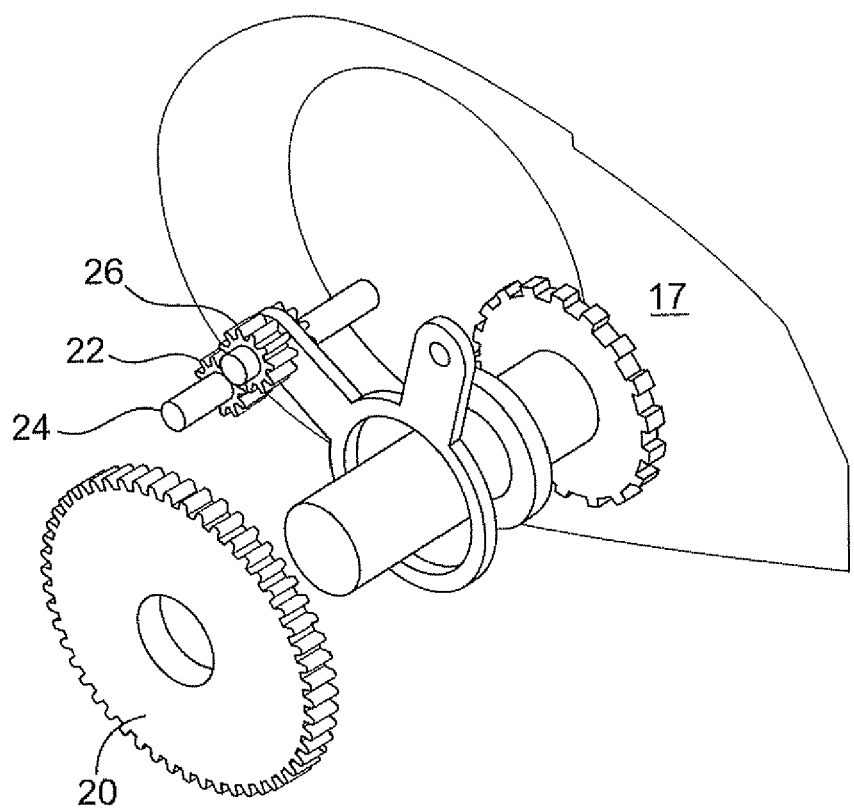
FIG. 4 is a fragmentary exploded view of the drive system shown in FIG. 3.

To accomplish this, the spool 18 is rotated through a series of gears such that the spool and handle are both rotated in a clockwise direction to reel in the line. As seen in FIGS. 3 and 4, this is accomplished by having the main gear 20 (typically associated with the handle) and the pinion gear 22 (typically associated with the spool shaft 24) interconnected by an intermediate gear 26 so that the main gear 20 and the pinion gear 22 rotate in the same direction. Of course, any odd number of intermediate gears could be used to have the same result of having the main gear 20 and pinion gear 22 rotate in the same direction in response to the clockwise turning of the handle. As seen in FIG. 2, the line comes off the bottom portion of the spool, typically between about the 3:00 o'clock and 6:00 o'clock positions, and then engages a level wind or line deflection member 28. The level wind 28 may be of any type known in the art. Preferably, the level wind 28 may be such as those disclosed in U.S. Pat. No. 6,446,895, 6,830,209 or 7,270,288, which are incorporated herein in its entirety by reference. As illustrated, the line passes over the top of such a level wind.

Figure 5:
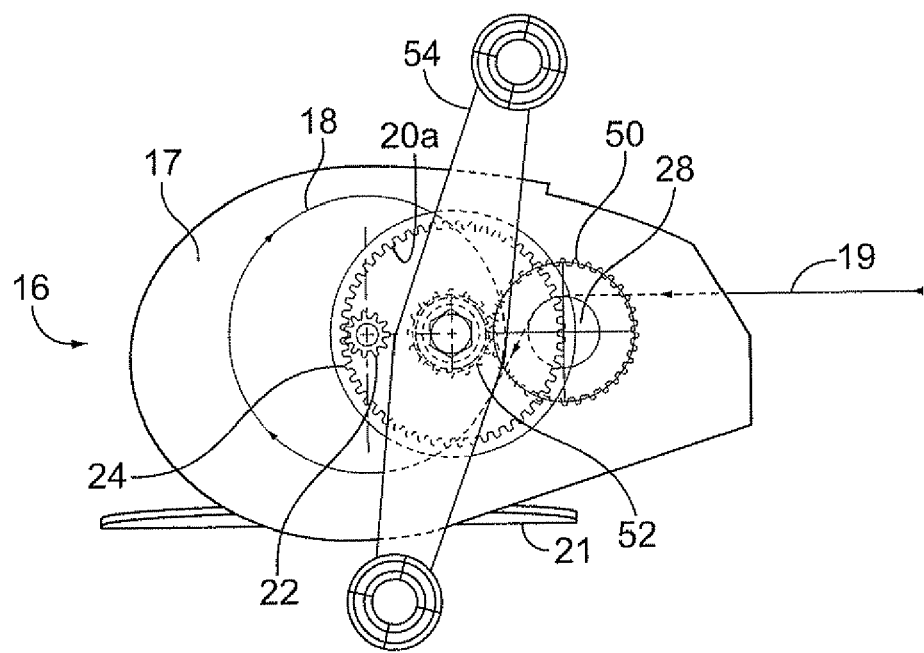
FIG. 5 is a side view of a bait casting reel in accordance with one aspect of the present disclosure showing a second embodiment of a drive system for rotating the spool and the level wind.

Alternatively, as shown in FIG. 5, the intermediate gear 26 may be eliminated and the handle crank directly rotate an internally-toothed main gear 20a that directly engages the pinion gear 22.

Figure 6:
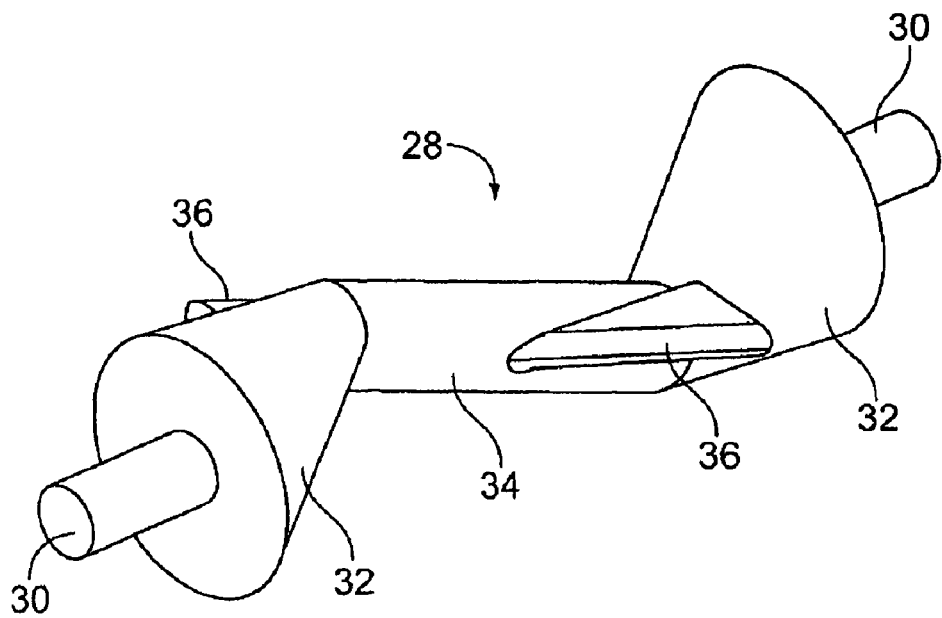
FIG. 6 is a perspective view of a level wind suitable for use in a bait casting reel in accordance with the present disclosure.
Figure 7:
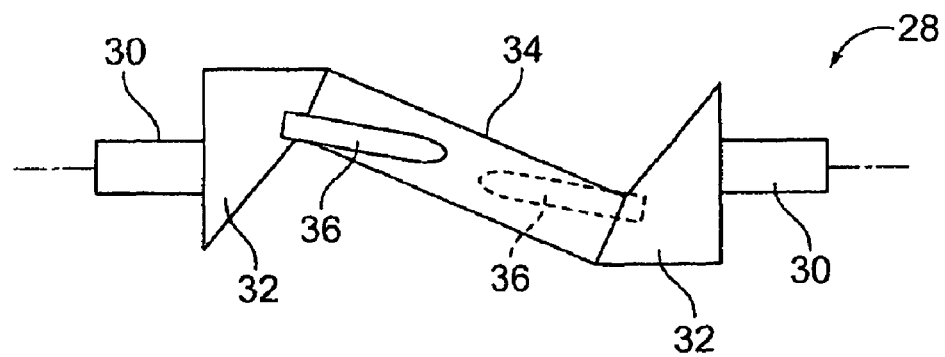
FIG. 7 is a plan view of the level wind shown in FIG. 5.

In keeping with another aspect of the disclosure, the level wind 28 is more preferably as illustrated in FIGS. 6 and 7 and comprises a shaft that is mounted for rotation between the side plates of the reel in front of its spool so as to have its axis of rotation substantially parallel to spool shaft. The level wind has a gear 50 associated therewith (FIG. 3) adapted to be rotated by a level wind gear 52 associated with the handle crank so as to impart rotation thereto. The level wind comprises a generally elongated shaft that is adapted to be rotatably secured between the opposed sidewalls of the fishing reel. The elongated shaft has stub axles at its opposite ends, a conically-shape collar extending from each stub axle and a central segment interconnecting the collars that is oriented obliquely with respect to the axis of rotation defined by the stub axles.

Referring to FIGS. 6 and 7, the shaft comprises a pair of stub axles 30 at its opposite ends from which a generally frustum-shaped collar 32 extends. As best seen in FIG. 6, the conic section defined by each collar 32 is asymmetric relative to the axis of rotation of the shaft. A central segment 34 is disposed between the collars obliquely or diagonally to the axis of rotation of the shaft. A transition segment or fillet 36 connects each opposed end of the central segment to its respective collar 32. The transition segments 36 define line engaging surfaces that are preferably co-planar or in planes parallel to each other.

In keeping with a further aspect of the disclosure, the position of the level wind relative to the spool may preferably be adjusted based upon the type of bait that is being cast so as to be relatively higher or lower with respect to the spool shaft. Specifically, the level wind may be selectively positionable relative to the sidewalls of the reel so that the axis of rotation of the level wind and the spool shaft maintain a generally parallel relationship. With reference to FIGS. 8-10, the front of the reel 40 is provided with a removable cover 42 that, in combination with the reel sidewalls, provides a number of discrete seats (four circular seats 44a-d being shown) for the level wind. With reference to FIGS. 11 and 12, each end of the level wind axle has a bearing 46 associated therewith sized to be received in the circular seats formed by the sidewalls and the front cover 42, the bearings 46 permitting rotation of the level wind 28 relative to the sidewalls when mounted on the reel. The seats 44a-d for the level wind are arranged in an arc along a radius from the axis of rotation 48 of the handle/drive gear for the level wind, thus ensuring that the teeth of the level wind gear associated with the handle crank mesh with the teeth of the gear associated with the level wind, regardless of which position is chosen for the level wind. The cover 42 may be maintained in place on the reel 40 by means of a hinge 56 and fastener 58, although other means may be used.

Figure 13:
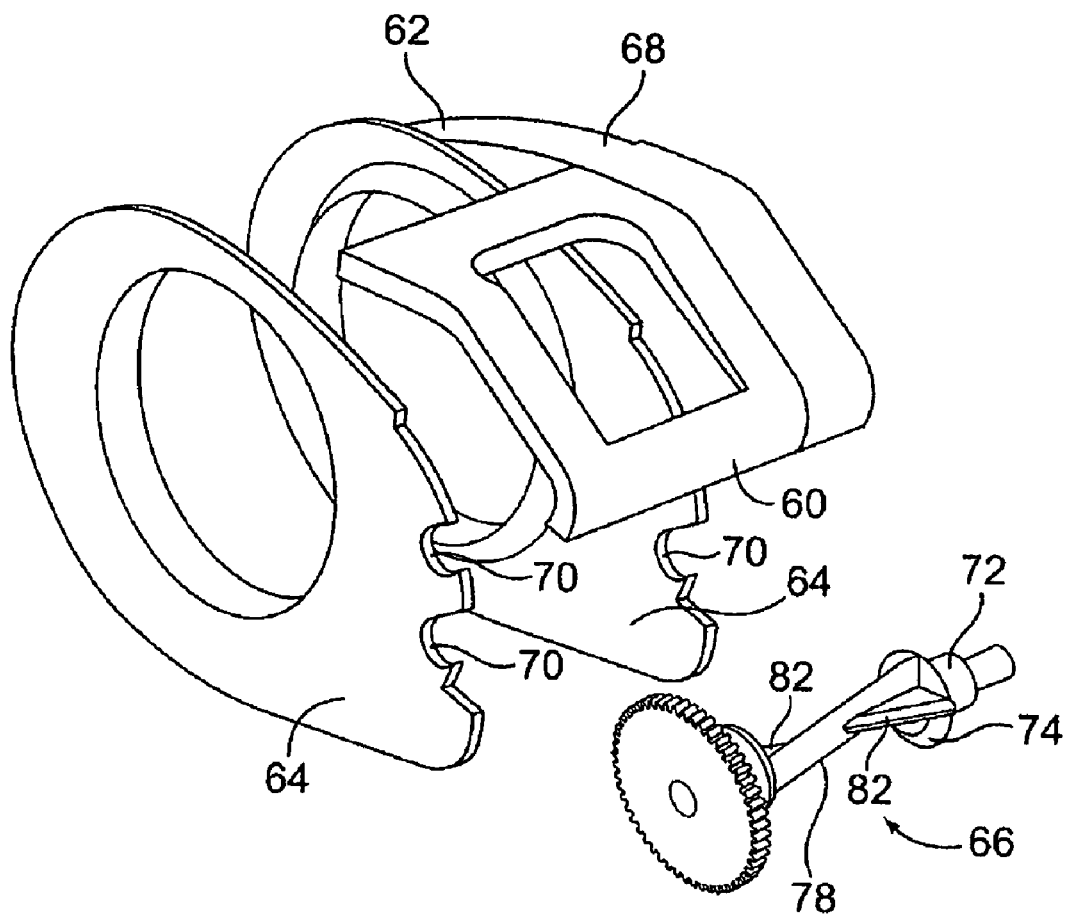
FIG. 13 is an exploded perspective view of an alternate to the bait casting reel shown in FIGS. 8-10, including an alternative level wind configuration, with parts omitted to show detail.

Alternatively, the cover 60 may be formed integrally with a cover 62 for the reel side plate 64, as shown in FIG. 13, with the cover 60 being movable to permit repositioning the level wind 66 by lifting the cover 60 and flexing the arm 68 that attaches the cover 60 to the side plate cover 62. The cover 60 may simply be snapped back into place once the level wind 66 is seated in its desired location. As shown in FIG. 13, the side plates 64 have two sets of discrete circular seats 70 for receiving the bearings 72 of the level wind 66, although more seats could be provided, as is the case in the embodiment of FIGS. 8-10.

Figure 14:
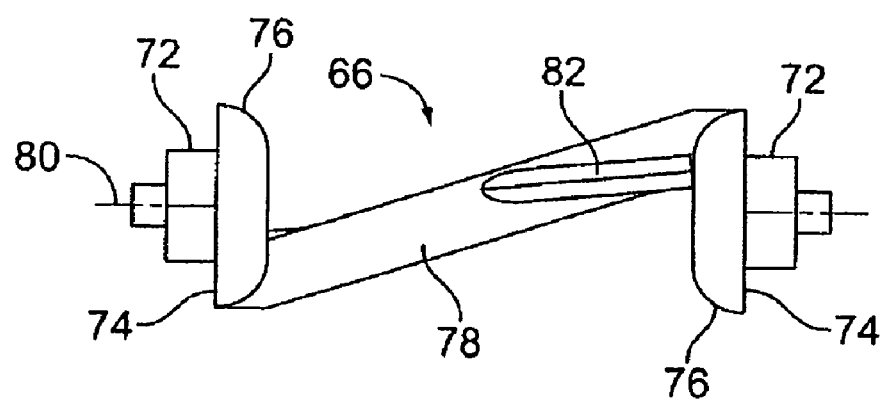
FIG. 14 is a plan view of the level wind shown in FIG. 13.

Further, the level wind 66 shown in FIG. 13 has a different configuration than that described above. With reference to FIGS. 13 and 14, the level wind 66 comprises generally disk-like 74 collars having curved edges 76, with the central segment 78 having a generally elliptical cross section and disposed between the collars 74 so as to be obliquely or diagonally oriented relative to the axis of rotation 80 of the level wind. A transition segment or fillet 82 connects with opposed end of the central segment 78 to its respective collar 74. The transition segments 82 define line engaging surfaces that are generally co-planar or are in planes that are parallel to each other.

Figure 15:
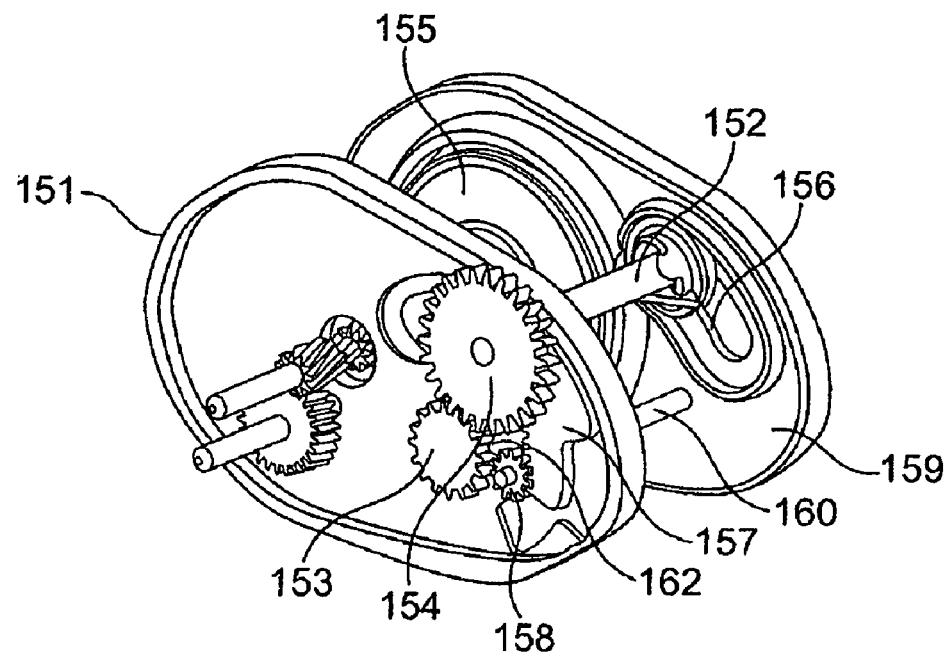
FIGS. 15-16 are perspective views of a further embodiment of a bait casting reel, partially dissembled, having a selectively positionable level wind.
Figure 16:
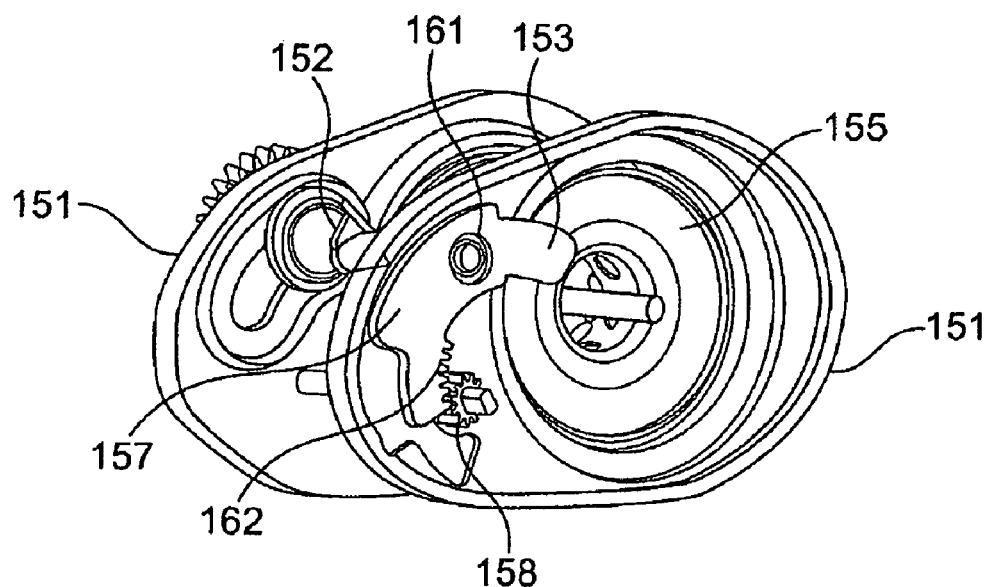

FIGS. 15 and 16 show a baitcasting reel 151 without side covers and drive gear to reveal the workings of a further embodiment of a reel having an adjustably positionable level wind. The reel 151 incorporates the reverse spooling feature described above, where the line comes from the bottom of the spool 155, closest to the pole, and over the top of the level wind or "deflecting member" 152.

As with the reels described above, when the reel is operated and the handle turned to retrieve fishing line, the shaft of the handle is also indexed and turns the deflection member driving gear 153. This gear interacts with and drives the deflection member driven gear 154, fixed with respect to the deflection member 152, to lay line evenly onto the spool 155. In this way, any of the level wind systems as disclosed herein, or those of the prior art, can be used with the current embodiment. The object of the preferred embodiment, therefore, is to maintain the mesh of the drive gear 153 and driven gear 154 to operate the deflection member 152, and to adjust the amount of deflection simultaneously. To accomplish this, the deflection member 152 follows a generally arcuate motion about the deflection member driving gear 153. While the preferred embodiment driving force utilizes a gear system, other power transfer methods may be employed to accomplish the same end, for example, a timing belt drive system, or any other method, that allows the power of the handle rotation to be ultimately transferred to the deflection member 152.

To control the position of the deflection member, the reel 151 uses a rack and pinion gear system whereby the racks have a circular shape. The racks 157 follow an arcuate cutout in the reel frame 156 that bearings 161 within the racks mate with to control the deflection member position. Specifically, two racks 157 on both sides of the reel frame 159 have gear teeth 162 that mesh with and are controlled by two pinion gears 158 that are connected and indexed relative to each other by a bar 60 so that both racks 157 move in unison through the arcuate cutout in the reel frame 156, 159. In this way, a heavy load on one side of the deflecting member, such as may be caused when a large fish strikes or when the angler sets the hook, will not cause the deflection member 152 to move asymmetrically and interfere with proper line wrap or effect the mesh of the gears.

Through this method, manipulation of the pinion gear 158 controls the position of the deflection member 152. Ideally, the mechanism allows the angler to adjust the position of the deflection member without any dismantling of the reel. In the illustrated embodiment, a spring-loaded adjustment device 158 including a spring-loaded button (not shown) fits onto a spline at the end of the bar 160 and is normally mated with the side cover (not shown), the button being accessible to the user through the side covers. The button, rod and pinion gear cannot turn as the button is spring-loaded to mesh into a series of ridges on the inside of the side cover. When pushed sufficiently inward toward the reel frame, the button can turn as the mesh of the button ridges to the ridges in the side cover do not interfere with each other and the button, rod and pinion gear can easily be rotated and, therefore, adjust the amount of deflection. Alternatively, a lever adjustment system or gearing system could be provided for adjusting the level wind position.

Thus, an improved bait casting reel has been provided. While the bait casting reel has been described in terms of certain preferred embodiments, this is for the purpose of illustration and not limitation.

The invention claimed is:

1. A fishing reel having an upper portion and a lower portion, and adapted to be secured to a fishing rod adjacent the lower portion, the reel comprising:
   a pair of opposed sidewalls;
   a spool holding fishing line rotatably supported between the sidewalls so as to be freely rotatable in a first counterclockwise direction to release fishing line from the spool at the lower portion of the reel adjacent the fishing rod when casting and to be mechanically rotated in a second direction opposite to the first direction to retrieve the fishing line and wind the fishing line onto the spool; and
   a hand crank for imparting rotation to the spool in the second direction.

2. The fishing reel of claim 1 further comprising a level wind mounted between the side walls so as to engage the fishing line as the line is released from or wound onto the spool.

3. The fishing reel of claim 2 wherein the level wind comprises a generally elongated shaft adapted to be rotatably secured between the opposed sidewalls and comprising stub axles at its opposite ends, a conically shaped collar extending from each stub axle, and a central segment having opposed ends and interconnecting the collars, the central segment being oriented obliquely with respect to the axis defined by the stub axles.

4. The fishing reel of claim 3 further comprising a transition segment between each end of the central segment and its respective collar.

5. The fishing reel of claim 1 wherein the handcrank imparts rotation to the spool in the second direction by rotation of the crank in the second direction.

6. The fishing reel of claim 1 wherein the hand crank has a first gear rotatably associated therewith, the spool has a second gear rotatably associated therewith, and a third gear rotatably interconnects the first and second gears.

7. The fishing reel of claim 6 wherein each of the first, second and third gears is externally toothed.

8. The fishing reel of claim 1 wherein the hand crank has a first, internally-toothed gear associated therewith and the spool has a second, externally-toothed gear associated therewith that meshes with the first gear.

9. A fishing reel comprising:
   a foot for securing the reel to a fishing rod;
   a pair of opposed sidewalls;
   a spool of fishing line having an axis of rotation and being rotatably secured to the sidewalls, the spool having a lower portion generally adjacent to the foot and an upper portion generally opposed to the lower portion and spaced away from the foot, the spool being freely rotatable in a first counterclockwise direction to release fishing line from the lower portion of the spool when casting and mechanically rotatable in a second direction opposite to the first direction to retrieve the fishing line and wind the fishing line on the spool; and
   a hand crank for imparting rotation to the spool in the second direction.

10. The fishing reel of claim 9 further comprising a level wind mounted between the side walls so as to engage the fishing line as the line is released from or wound onto the spool.

11. The fishing reel of claim 10 wherein the level wind comprises a generally elongated shaft adapted to be rotatably secured between the opposed sidewalls and comprising stub axles at its opposite ends, a conically shaped collar extending from each stub axle, and a central segment having opposed ends and interconnecting the collars, the central segment being oriented obliquely with respect to the axis defined by the stub axles.

12. The fishing reel of claim 11 further comprising a transition segment between each end of the central segment and its respective collar.

13. The fishing reel of claim 9 wherein the handcrank imparts rotation to the spool in the second direction by rotation of the crank in the second direction.

14. The fishing reel of claim 9 wherein the hand crank has a first gear rotatably associated therewith, the spool has a second gear rotatably associated therewith, and a third gear rotatably interconnects the first and second gears.

15. The fishing reel of claim 14 wherein each of the first, second and third gears is externally toothed.

16. The fishing reel of claim 9 wherein the hand crank has a first, internally-toothed gear associated therewith and the spool has a second, externally-toothed gear associated therewith that meshes with the first gear.

* * * * *